United States Patent [19]

Gresse et al.

[11] Patent Number: 4,641,919
[45] Date of Patent: * Feb. 10, 1987

[54] STEREOSCOPIC VIEWER FOR AERIAL PHOTOGRAPHS

[75] Inventors: Herve R. Gresse, Boulogne; Annick R. Carn, Versailles, both of France

[73] Assignee: Compagnie de Materiel de Micrographie "C.M.M.", St. Maur, France

[*] Notice: The portion of the term of this patent subsequent to Feb. 12, 2002 has been disclaimed.

[21] Appl. No.: 559,289

[22] Filed: Dec. 8, 1983

Related U.S. Application Data

[63] Continuation-in-part of Ser. No. 394,841, Jul. 2, 1982, Pat. No. 4,498,735.

[30] Foreign Application Priority Data

Jul. 8, 1981 [FR] France ............................... 81 13384

[51] Int. Cl.$^4$ ............................................ G02B 27/24
[52] U.S. Cl. .................................................. 350/138
[58] Field of Search ............... 350/135, 136, 137, 138, 350/517

[56] References Cited

U.S. PATENT DOCUMENTS 4,221,462  9/1980  Huvers ................................. 350/136
4,498,735  2/1985  Gresse et al. ........................ 350/138

Primary Examiner—John K. Corbin
Assistant Examiner—Vincent J. Lemmo
Attorney, Agent, or Firm—Cushman, Darby & Cushman

[57] ABSTRACT

The invention relates to a stereoscopic viewer for aerial photographs. In this viewer, optical means permit simultaneous examination, through two eyepieces, of corresponding points in two successive panoramic photographs in the film to be examined. The optical means comprise, for each optical path, on the one hand, a set of plane-mirrors and, on the other hand, a rotating system adapted to rotate the images about the corresponding viewing axis, the unit thus assuring an even number of reflections; the adjusting means comprise elements permitting at least one of the rotating systems to pivot about a fixed axis and/or the displacement of at least one of the plane-mirrors.

23 Claims, 8 Drawing Figures

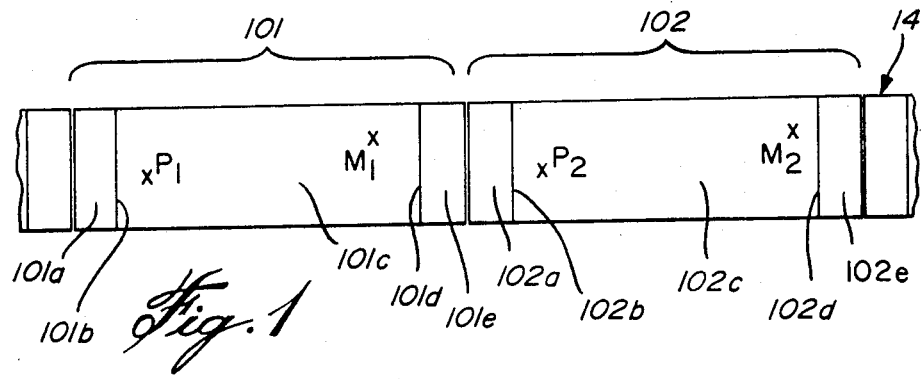
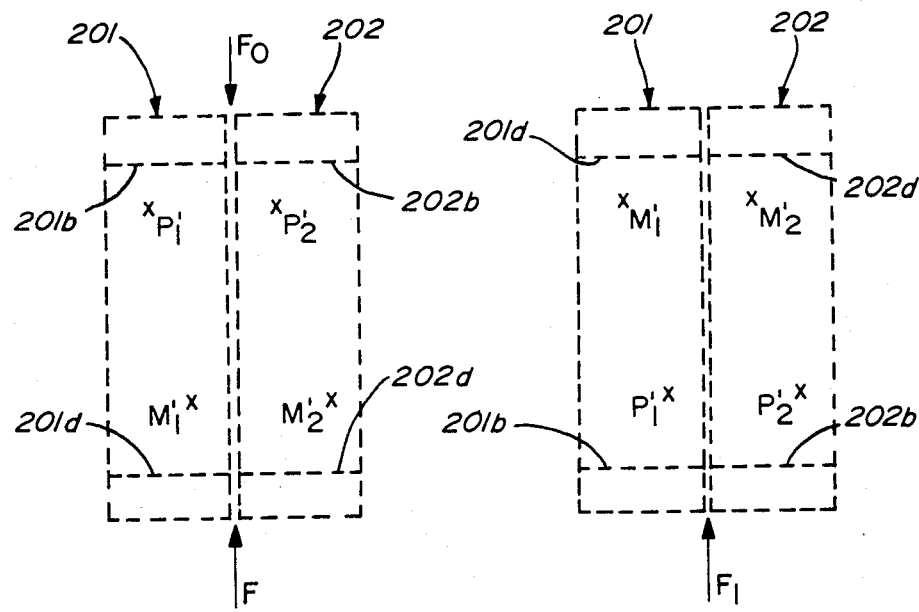

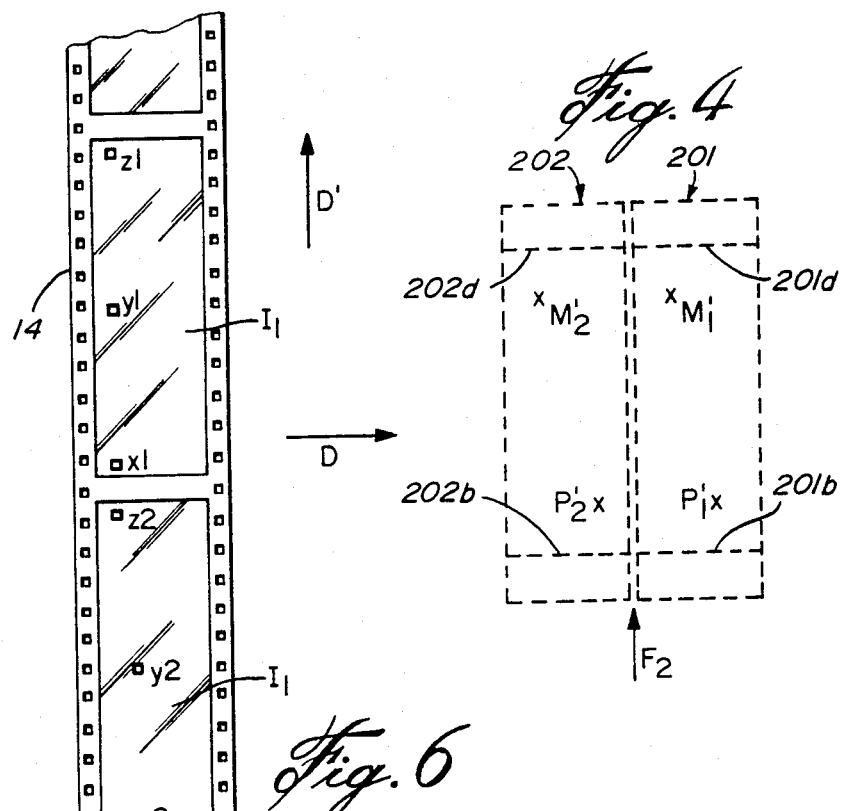

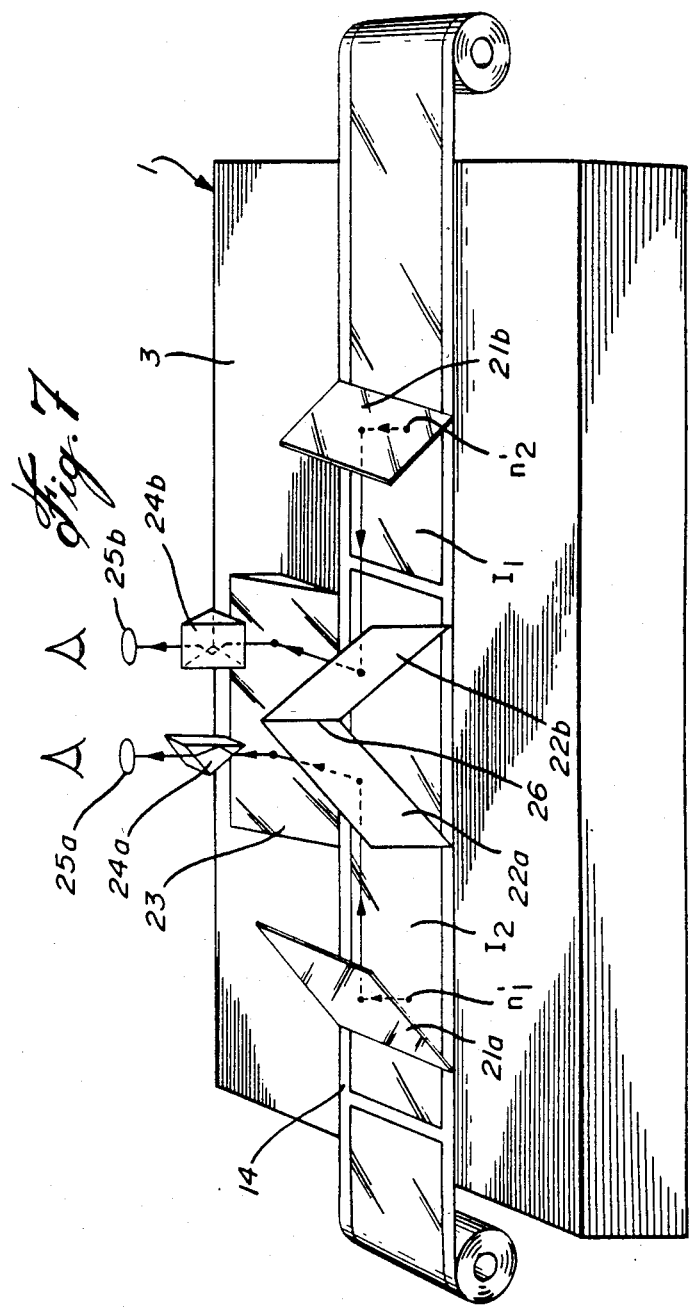

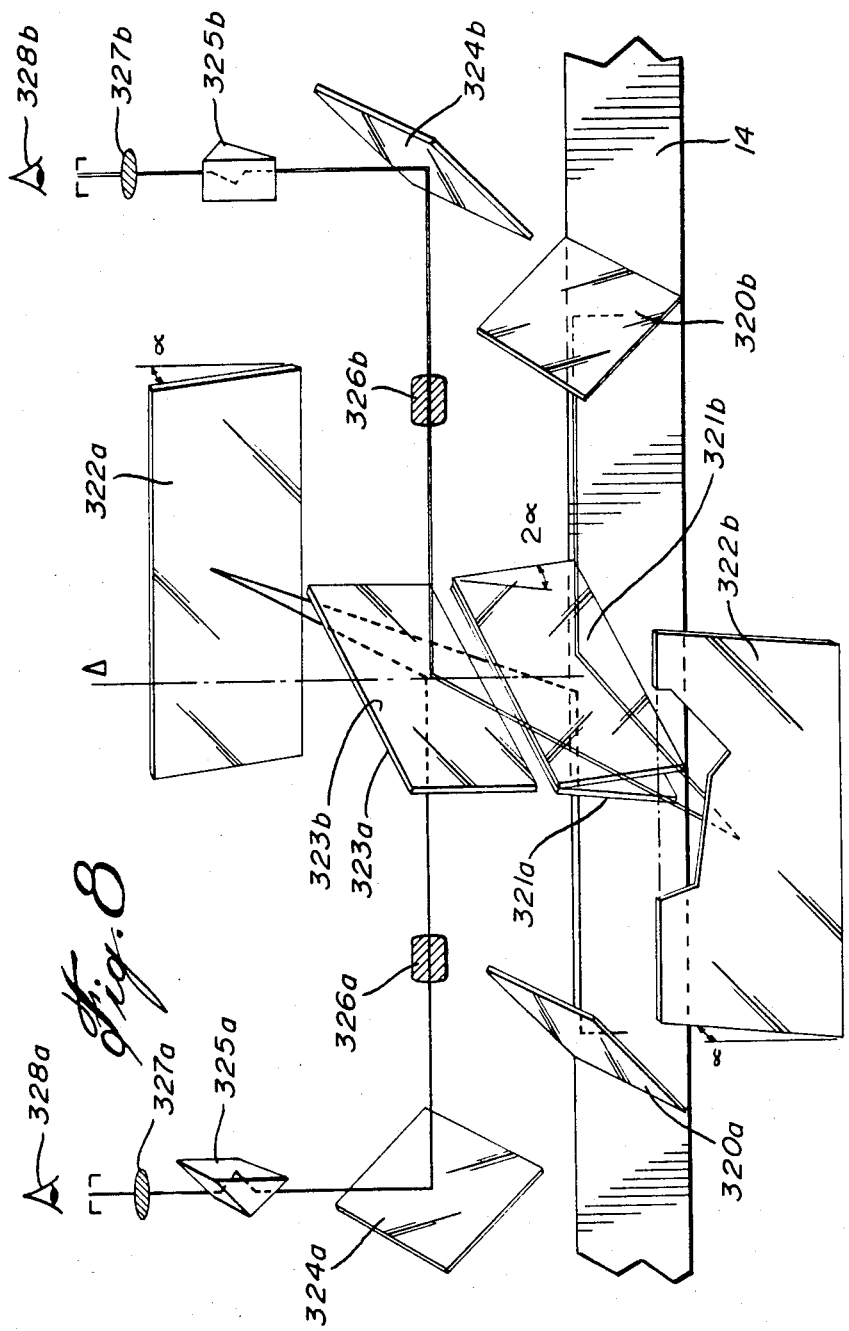

STEREOSCOPIC VIEWER FOR AERIAL PHOTOGRAPHS

The present invention relates to a stereoscopic viewer intended for simultaneous examination of two successive images in a film of panoramic exposures produced, more particularly, by an aerial camera.

A viewer of this type is generally located above a flat translucent support upon which the film of panoramic exposures is laid flat, suitable lighting being arranged below the flat translucent support. The viewer comprises, in known fashion, between two objectives facing the film to be observed, and two eyepieces, optical means permitting simultaneous examination of two successive panoramic images on the film, together with adjusting means permitting displacement of one of the two images received by the observer in relation to the other.

A stereoscopic viewer makes it possible to observe a film taken with a camera aboard an aircraft. The camera is directed downwardly and, while exposures are being made, it may pivot about an axis running parallel with the direction of travel of the aircraft. Thus, when an exposure is being made, the camera is displaced, in relation to the pilot of the aircraft, from left to right or from right to left, in such a manner that, on each of the panoramic images on the film, there appears, at the ends of a given image, in the longitudinal direction of the film, the right-hand horizon and the left-hand horizon of the area over which the aircraft is travelling. It follows that, in the case of a film of panoramic exposures, the printed images all start, in one longitudinal direction of the film, with the right-hand horizon and therefore, in the other longitudinal direction, with the left-hand horizon. In order to observe a film of this kind with a conventional stereoscope, the film must be cut in such a manner as to place two successive images side by side transversely, so that the right-hand horizon of the one is adjacent the right-hand horizon of the other, and that the left-hand horizon of the one is adjacent the left-hand horizon of the other.

The viewer according to U.S. Pat. No. 4,221,462 makes it possible to dispense with such cutting. It also comprises means permitting transverse displacement of one of the two images received by the observer in relation to the other, in order to allow them to merge. The purpose of these means of adjustment is to correct the well-known distortion arising from the fact that, between two successive photographs, the image of a point located vertically below the aircraft shifts transversely in the plane of the film substantially faster than the images of points located on the left- or right-hand horizons. This relative displacement of points in images, due to the movement of the photographing aircraft, is a function of the speed and altitude thereof. In the above-mentioned patent, control of the relative displacement of the two images, depending upon the part of the image examined, is obtained by complex mechanical means providing appropriate, progressive displacement of the two objectives of the viewer, the distance between the two objectives passing through a maximum at the moment when they are arranged perpendicularly to the centre of the two successive panoramic images under observation. The design of this complex device makes it not very manageable.

It is an object of the present invention to eliminate the aforesaid disadvantage. It proposes, to this end, a stereoscopic viewer of the type mentioned hereinbefore which will provide particularly simple control of the relative position of the two images received by the observer, using a very small number of uncomplicated mechanical elements.

Another object of the invention is to provide a stereoscopic viewer which is practical, reliable and compact.

The object of the present invention is therefore a stereoscopic viewer for aerial photographs, the viewer being intended to be placed opposite a film of panoramic exposure to be examined, the film being laid flat and being appropriately illuminated, the viewer comprising, in the first place, optical means permitting simultaneous examination, through two eyepieces having substantially parallel axes, of two corresponding points in two successive panoramic photographs in the film to be examined, the means defining an optical path between each of the two aforesaid photographs and one of the observer's eyes and, in the second place, adjusting means making it possible to displace one of the two images received by the observer in relation to the other, characterized in that the optical means comprise, for each optical path, on the one hand, a set of plane-mirrors and, on the other hand, a rotating system capable of rotating the images substantially about the corresponding viewing axis, the unit thus assuring an even number of reflections; and in that adjusting means comprise elements permitting at least one of the two rotating systems to pivot about a fixed axis and/or the displacement of at least one of the plane-mirrors.

According to one advantageous configuration, the image-rotating system is a total-reflection prism; in this case, each prism is preferably a right prism having as a base a right-angled isosceles triangle, the total-reflection faces being substantially perpendicular to the plane of the film to be examined. According to another configuration, the image-rotating system is a so-called "Pechan" system comprising two prisms upon which five reflections are made. If the image-rotating system is a total-reflection prism, the adjusting means comprise elements permitting at least one of the two prisms to pivot about an axis parallel with its edge facing the total-reflection face; in the case of a right prism having as a base a right-angled isosceles triangle, the pivot axis coincides, with advantage, with the edge of the right dihedral of the prism. The axes of the two eyepieces are arranged, advantageously, in a plane substantially parallel with the longitudinal axis of the film to be examined.

The film to be examined is preferably illuminated by arranging it upon a translucent support comprising a lighting means arranged on the side of the support where there is no film.

The adjusting elements used in the invention are obviously much simpler than those used in U.S. Pat. No. 4,221,462 to provide transverse mechanical displacement of the two objectives of the viewer as a function of their position over the two successive panoramic images examined simultaneously. In the case of the invention, all that is required is for one of the two rotating systems to pivot about an axis and/or displacement of at least one plane-mirror. It is thus possible, for example, for the pivot-axis of one rotating system to project outside the housing of the stereoscopic viewer and to terminate in a control knob which may be operated by the observer.

If the image-rotating system is in the form of a prism having a total-reflection face at right angles to the longitudinal axis of the film, and if this prism is caused to rotate in relation to its edge facing the total-reflection face, this produces transverse displacement of the examined area of the corresponding image in the film, and this makes it possible to compensate for the displacement of corresponding points in two successive panoramic images. On the other hand, if the other prism is caused to rotate about its edge facing the total-reflection face, and substantially parallel with the longitudinal axis of the film, displacement is produced, along the axis of the film, of the examined area of the corresponding image in the film, which may be useful if the length of the images in the film are modified slightly.

The distance between the two axes of the eyepieces of the viewer according to the invention corresponds to distance between the eyes, i.e. approximately 65 mm. Under these conditions, the two parallel incident beams impinging upon the two rotating systems are thus about 65 mm apart. Now the viewer according to the invention is used to examine films having definitely higher image periodicities, for example 250 mm; the two inlets to the optical paths of the viewer face two successive panoramic images in the film and are therefore spaced from each other at a distance substantially equal to the aforesaid image-periodicity of the film. It is therefore desirable to arrange, between the two rotating systems and the film to be examined, a set of mirrors receiving two parallel incident beams emanating from two corresponding points in two successive images in the film, permitting them to be returned in parallel and not so far apart on the two rotating systems.

In a first variant, a set of mirrors of this kind comprises, for each of the two incident beams which it receives successively from the film to be examined:

a first mirror arranged at about 45° to the plane of the film to be examined and perpendicularly to the longitudinal plane of symmetry of the film, the reflecting surface of the mirror facing the film;

a second mirror receiving the beam reflected by the first mirror, the plane of the second mirror being perpendicular to the plane of the film to be examined and forming an angle of about 45° with the axis of the film;

and a third mirror reflecting the beam emanating from the second mirror and passing it to the inlet face of one of the two rotating systems.

According to another characteristic, the second mirrors are mounted to pivot about an axis parallel with the intersection-edge of their planes. This permits transverse displacement of corresponding zones examined in two successive images. Overall transverse adjustment may also be obtained by displacing the viewer as a whole in relation to the film. This transverse positioning of the viewer may be facilitated by a system of brackets or rails running transversely in relation to the film and upon which the viewer is mounted.

The third mirrors are preferably stationary and are combined to form a single element, the reflecting face of which forms an angle of about 135° to the plane of the film to be examined.

In a second variant, an attempt has been made to improve the apparatus of the first variant since the latter has a disadvantage which will be explained hereinafter in conjunction with FIGS. 1 and 2 of the drawing attached hereto. FIG. 1 represents a film of panoramic exposures, 101 and 102 being successive images in this film. Located in each image, moving from left to right in FIG. 1, there is an area of sky marked with the index a, the left-hand horizon marked with the index b, the photographed land area corresponding to the sweep of the camera to the right, marked with the index c, the right-hand horizon marked with the index d, and finally an area of sky marked with the index e. These five elements appear in each successive image in the film in the order indicated above and in FIG. 1. This defines elements 101a, 101b, 101c, 101d, 101e and 102a, 102b, 102c, 102d, 102e for images 101 and 102. $M_1$ and $P_1$ are two points in photograph 101 located near the two horizons, while $M_2$ and $P_2$ are two corresponding points in photograph 102. FIG. 2 shows images 201, 202 seen by the observer in the viewer according to the first variant. These images 201, 202 of photographs 101 and 102 respectively show left-hand horizons 201b, 202b with the sky above the line of the horizon, whereas the reverse occurs in the case of right-hand horizons 201d, 202d. The result of this is that the observer placed at the side of the viewer indicated by arrow F sees, in the eyepieces, a normal representation of images $P'_1$ and $P'_2$ of points $P_1$ and $P_2$ in relation to which the sky is in its normal position, whereas he sees an inverted representation of images $M'_1$ and $M'_2$ of points $M_1$ and $M_2$ in relation to which the sky is at the bottom. Although this problem can be overcome if the observer changes sides in relation to the axis of the film, viewers are frequently arranged in such a manner that an observer cannot walk round them and can therefore observe the film from one location only. In this case, the observer will see one half of the exposure the right way up and the other half upside down.

It is the purpose of the second variant to overcome the foregoing disadvantage. To this end a viewer is proposed which comprises a device permitting the image to be inverted, with no need for the observer to leave his station. The observer thus examines half of the panorama with the inverting device in a first position and, prior to examining the other half, he reverses the image so that he can see this other half also the right way up.

It should be noted that this result could not be obtained with the viewer according to the first variant since, although it was possible to rotate each of the two prisms in the two optical paths through 90° about an axis parallel with the total-reflection face, in order to reverse the image provided by each eyepiece, the result thus obtained appears in FIG. 3. In this case, the observer stationed on the side indicated by arrow $F_1$ sees, with his right eye, the point $M'_2$ and, with his left eye, the point $M'_1$, whereas he would have seen $M'_1$ with his right eye and $M'_2$ with his left eye if he had moved to the side indicated by arrow $F_0$ in FIG. 2. Rotation of the two prisms of the apparatus according to the first variant ensures inversion of the image, allowing the right eye to see what the left eye should see, and vice-versa; instead of a normal stereoscopic-relief view, this provides a reverse stereoscopic-relief view, i.e. projections are seen as depressions and vice-versa, which is unsatisfactory. On the other hand, the viewer according to the second variant makes it possible to obtain complete inversion of the image as shown in FIG. 4, i.e. the observer stationed at arrow $F_2$ in FIG. 4 sees exactly the same thing as an observer stationed at arrow $F_0$ in the case of the non-inverted images in FIG. 2.

According to the invention, the second variant of the stereoscopic viewer is characterized in that, in the first place, the sets of plane mirrors associated with each of the optical paths each comprise m mirrors which cause rays emanating from two corresponding points in two successive panoramic photographs to fall in parallel, but upside down, onto two parallel inverting mirrors which are integral, placed back to back, and adapted to pivot through 90° about an axis at right angles to the incident rays; and in that, in the second place, the set of mirrors of each optical path comprises one of the inverting mirrors followed, along the optical path, by p mirrors which pass the rays which are reflected onto the inverting mirror towards the rotating system associated with each eyepiece, m and p being positive whole numbers.

In the case of the viewer according to this second variant, in order to achieve inversion of the image, the rotating systems associated with eyepiece are actuated. This produces an inversion such as that shown in FIG. 3 in relation to the initial position shown in FIG. 2. The two inverting mirrors are pivoted through 90° about their pivot-axis, so that the rays initially passing to the left eyepiece pass to the right eyepiece and vice-versa. This produces a change from stereoscopic-image position shown in FIG. 3 to that shown in FIG. 4. The viewer thus makes it possible to obtain complete inversion of the image, without the inconvenience of inverted stereoscopy.

In one preferred example of embodiment of the second variant, the image-rotating system is a total-reflection prism and (m+p) is an even number; the pivot-axis of the two inverting mirrors is preferably perpendicular to the plane of the film to be examined; in order to avoid undue bulk, the viewer comprises, for each optical path, three mirrors between the film and the inverting mirror, these three mirrors consisting successively, from the film to be examined, in the first place, of a first mirror arranged substantially at 45° to the plane of the film, substantially perpendicularly to the longitudinal plane of symmetry of the film, the reflecting surface of the mirror facing the film; in the second place, of a second mirror receiving the rays reflected onto the first, this second mirror forming an angle close to 45° with the longitudinal axis of the film and an angle (90+α) with the plane of the film to be examined, α having substantially the same low positive value for the two optical paths, the planes of the second mirrors of the two optical paths having substantially parallel traces on the plane of the film to be examined; and in the third place, of a third mirror receiving the rays reflected onto the second and passing them to the inverting mirror, the plane of this third mirror having a trace in the plane of the film to be examined, which is substantially parallel with the axis of the film and forms, with the plane of the film, an angle close to (90°−α) to make the reflected rays substantially parallel with the plane of the film to be examined.

It may with advantage be provided that, for each optical path, the viewer according to this second variant comprises a single mirror between the inverting mirror and the observer's eye, this fourth mirror receiving the rays from the inverting mirror; the planes of the inverting mirrors are substantially perpendicular to the plane of the film and their traces in the plane of the film form an angle of substantially 45° with the longitudinal axis of the film; the traces, in the plane of the film, of the planes of the fourth mirrors are substantially perpendicular to the axis of the film, and the viewing axes corresponding to the two eyes of the observer are substantially perpendicular to the plane of the film.

Furthermore, it is desirable to provide means for controlling the rotation of the images received by the observer; these means comprise elements permitting the prisms to pivot about an axis perpendicular to their edges facing the total-reflection faces.

In the case of either of the two variants, at least one of the two first mirrors may be mounted slidably in the interior of a slide, in such a manner as to be able to be displaced, in relation to the other mirror, along the longitudinal axis of the film to be examined. Thanks to this arrangement, the viewer according to the invention may easily be adjusted to adapt to the length corresponding to image-periodicity of different films by displacing to a greater or lesser degree the one of the two mirrors which is arranged to slide in relation to the other.

In either of the two variants, it is possible to locate, between each rotating system and one of the observer's eyes, a converging lens returning the image received to infinity, the focus of the lens being located upon the film to be examined. Provision may also be made to arrange, between each convergent lens and one of the observer's eyes, an afocal magnification-multiplying unit; the coefficient of the afocal unit used may be between 2 and 8, for example. More generally, a group of lenses may be provided, in each optical path, making it possible to increase the magnification. This arrangement is particularly useful in the case of the second variant of the viewer since, in relation to the first variant, the length of the optical path has been increased and this brings about a decrease in magnification; the objective, eventually associated with a field condensing lens provides an image of the aerial photograph examined, and the eyepiece makes it possible to observe the image.

In order to provide a better understanding of the object of the invention, a purely illustrative and by no means restrictive description will now be given of the two examples of embodiment illustrated in the drawing attached herein, wherein:

FIG. 1 represents a film of aerial panoramic exposures;

FIG. 2 represents the images of two successive panoramic photographs of the film seen simultaneously by the observer's right and left eyes for the purpose of obtaining stereoscopic vision;

FIG. 3 represents the images in FIG. 1 after inversion due solely to the rotating system of each of the two optical paths;

FIG. 4 represents the images in FIG. 2 after complete inversion as obtained by the apparatus according to the second variant;

FIG. 5 is a diagrammatical external view of the viewer according to one or the other of the two variants according to the invention;

FIG. 6 is an enlarged plan view of a part of the film in FIG. 5;

FIG. 7 is a diagrammatical perspective view of the stereoscopic viewer according to the first variant, showing the constituent optical elements and the relative positions thereof;

FIG. 8 is a diagrammatical perspective view of the different elements in the two optical paths of the viewer according to the second variant.

Reference will first be made to FIGS. 5, 6 and 7 which deal with the first variant of the viewer according to the invention.

FIG. 6 shows two successive photographic images $I_1$ and $I_2$ in a film taken by a panoramic exposure camera mounted in an aircraft. During the exposure, the aircraft travels in the direction D while film within the camera unwinds in the direction D'. The camera is directed downwardly and, during the exposure, it pivots in a vertical plane about an axis parallel with the direction D of travel of the aircraft. Thus in relation to the aircraft pilot, or to an observer located in the direction of travel D, the camera will be displaced for one exposure in a sweeping motion going from the right-hand horizon to the left-hand horizon. In other words, for each image $I_1$, $I_2$ recorded, the central part corresponds to the exposure taken by the camera while it was pointing vertically downwards, whereas each of the edges of the image perpendicular to the axis of the film corresponds to the beginning or the end of the sweeping motion of the camera while it was pointing towards the right- or left-hand horizon. If, on panoramic image $I_1$, $x_1$ is an image-point on the right-hand horizon (in relation to aircraft pilot), $z_1$, located near the opposite edge, is an image-point on the left-hand horizon, and $y_1$, located on the median transverse axis of panoramic image $I_1$, is the nadiral image-point. Corresponding to one point object Z on the left-hand horizon is image point $z_1$ on panoramic image $I_1$, and also corresponding to this same point object Z is image-point $z_2$ located on the following panoramic image $I_2$. Similarly, image-points $x_2$ and $y_2$ on $I_2$ correspond to image-points $x_1$ and $y_1$ on $I_1$: $x_1$ and $x_2$, $y_1$ and $y_2$ and $z_1$ and $z_2$ are said to be corresponding points in two successive images corresponding respectively to object-points X,Y,Z in the space photographed.

It is known that with flight in the direction of arrow D, the image of an object-pointed located on the horizon is scarcely displaced transversely in the plane of the film in passing from one image to the next, whereas the image of an object-point located vertically below the aircraft, i.e. at the nadir, moves transversely in the plane of the film over a by no means negligible distance; this produces transverse distortion as a function of aircraft altitude and speed. As shown in FIG. 6, therefore, the transverse distance separating corresponding image-points $y_1$ and $y_2$ is definitely greater than the transverse distance two corresponding image-points $x_1$-$x_2$ or $z_1$-$z_2$ located respectively on the right- or left-hand horizon, this latter distance being practically negligible.

In FIG. 5, a luminous table 1, of known type, comprises a lateral wall 2 surmounted by a horizontal sheet 3 of translucent glass; lighting (not shown) is located under this sheet of glass.

A film 14 of panoramic exposures to be examined is unwound and is applied flatly to sheet 3 of translucent glass by means of conventional elements, not shown. In this example of embodiment, the length of the film images is 250 mm; an OMERA 40 camera was used to take the pictures.

In this example, a stereoscopic viewer 10 rests directly upon sheet 3 of translucent glass on luminous table 1; the viewer is arranged astride film 14, housing 11 thereof being supported, to this end, upon four low rubber feet 13 above sheet 3 of translucent glass; housing 11 carries two eyepieces 12, the distance between which is adjustable to the distance between the observer's pupils. The parallel axes of eyepieces 12 are arranged in a plane parallel with the longitudinal axis of the film to be examined, whereas in U.S. Pat. No. 4,221,462 the plane of the axes of the two viewing eyepieces of the viewer is arranged at right angles to the axis of the film. The arrangement of the axes of eyepieces 12, in a plane parallel with the axis of the film, in an interesting characteristic, since the observer is thus located, in relation to each panoramic image on the film, in the same way as the aircraft pilot in relation to the area being photographed. In this way, the part of each panoramic image located to the observer's left corresponds to the area to the left of the pilot, and this obviously facilitates referencing.

Arranged on the lower surface of housing 11, which is adjacent and parallel with sheet 3 of translucent glass, are two apertures constituting the inlets to two optical paths in viewer 10 relating to two successive panoramic images $I_1$ and $I_2$ to be examined. Located opposite each of the said apertures is a mirror $21a,21b$ respectively arranged symmetrically in relation to a vertical plane at right angles to the plane of the film to be examined, with their reflecting surfaces facing towards each other; each mirror is arranged at 45° to the plane of the film and the intersection-edge of their planes is at right angles to the longitudinal axis of the film.

The projections of the centres of the two mirrors $21a,21b$ onto the plane of the film are marked $n'_1$ and $n'_2$; the distance between the two projections $n'_1$ and $n'_2$ is substantially equal to the length of the panoramic image on film 14 and is therefore definitely greater than the distance between the two eyepieces 12.

Mirrors $21a,21b$ are preferably mounted upon longitudinal slides (not shown) within housing 11, so that the distance between them can be adjusted as a function of the length of the panoramic images in different films.

Located between mirrors $21a,21b$ are two other mirrors $22a,22b$ which are symmetrical with the vertical plane of symmetry of mirrors $21a,21b$; each mirror $22a,22b$ is arranged in a vertical plane at an angle of 45° to the longitudinal axis of film 14. The two mirrors $22a,22b$ form a right dihedral having a vertical edge 26; mirrors $22a,22b$ are preferably mounted to pivot about an axis passing through their common vertical edge 26; this permits slight variations in the 45° angle which they make with the axis of the film to be examined, while still maintaining the same plane of symmetry.

The light rays reflected by mirrors $21a,21b$ are reflected by associated mirrors $22a,22b$ and pass to a common stationary mirror 23, the reflecting face of which forms an angle of 135° with the plane of film 14. Mirror 23 receives two parallel light beams reflected by the pair of mirrors $22a,22b$ and reflects them vertically upwards towards prisms $24a,24b$.

It should be noted that mirrors $21a,21b$, and common mirror 23, constitute an optical system making it possible to bring together the two incident light beams emanating from the two image-parts examined which are about 250 mm apart, so that these two beams, upon leaving the system, are only about 65 mm apart, i.e. the average distance between the eyes of an observer.

Prisms $24a,24b$ are identical right prisms arranged on each side of the vertical plane of symmetry of mirrors $21a,21b,22a,22b$. The base of prisms $24a,24b$ is a right-angled isosceles triangle; the two hypotenuses thereof are arranged at right angles to the plane of film 14 and they form an angle of 90° to each other. The hypotenuse of prism $24a$ is at right angles to the longitudinal axis of the film.

In the case of each prism $24a,24b$, the light rays reflected by mirror 23 pass through one of the two faces of the right dihedral, are reflected by the hypotenuse, and emerge through the other face of the right dihedral. The light rays passing through prisms $24a,24b$ are not deflected in any way. At the outlets from prisms $24a,24b$ there appear two emerging vertical beams, the distance between which is the same as that between the two incident vertical beams; each of these beams is directed to a convergent lens 25a,25b located within each eyepiece 12. The two convergent lenses 25a,25b reflect the image to infinity, the foci thereof being arranged in the plane of film 14, bearing in mind the optical path.

Finally, the optical system of the stereoscopic viewer by two afocal magnification-multiplying units (not shown) located between convergents lenses 25a, 25b and the eyes of the observer. The magnification of the units used may vary between 2 and 8.

One of the essential characteristic elements of stereoscopic viewer 10 is the ease of relative transverse adjustment of the two images received by the observer; thus, in order to eliminate, from the zone observed, the transverse displacement of corresponding points in the two images examined, the observer varies the angle of the hypotenuse of prism 24a by causing it to pivot about its opposite horizontal edge. This variation of the angle of prism 24a may be carried out by very simple mechanical means, for instance an axis arranged along the edge of the prism and integral therewith, the axis extending, for example, outside housing 11 in the form of an operating knob. This displaces, on the film, the image-zone observed through prism 24a, whereas that observed through prism 24b remains stationary. This makes it possible to compensate for transverse displacement of corresponding points.

It is to be understood that transverse adjustment of the stereoscopic viewer in relation to the film, i.e. simultaneous transverse adjustment of the two images received by the observer, may be obtained by displacing viewer 10 transversely in relation to the film. Transverse adjustment may also be effected by causing associated mirrors 22a,22b to pivot slightly about an axis parallel with their intersection-edge 26.

On the other hand, rotating prism 24b about its edge facing the hypotenuse causes longitudinal displacement of the zone observed through this prism, which may make it possible for a slight variation in the length of successive images.

A description will now be given of a second variant of the viewer according to the invention. The exterior of this viewer is as in FIG. 5 and this will therefore not be described again. The film of exposures used is the same as that described for the first variant.

Located opposite each of the apertures in housing 11, constituting the inlets to the two optical paths of the viewer, is a plane-mirror 320a,320b respectively; these two mirrors are arranged symmetrically in relation to a vertical plane at right angles to the plane of the film to be examined and at right angles to the axis of the film; the reflecting surfaces of mirrors 320a,320b face each other, the mirrors being arranged at an angle of 45° to the plane of film 14.

A ray leaving a point on film 14, at right angles thereto, is reflected onto one first mirrors 320a,320b and is brought to the centre of the viewer where it meets a second plane mirror 321a or 321b. These second mirrors are in planes which intersect the plane of film 14 along parallel traces forming an angle of 45° with the axis of the film. The planes of each of mirrors 321a,321b form, with the plane of film 14, an angle of 95°, this angle being calculated between the reflecting face of the mirror and the half-plane of the film where the corresponding first mirror is located. The two second mirrors form between them a 10° dihedral angle. Since mirrors 321a,321b are not at right angles to the plane of the film, but are instead inclined slightly in an upward direction, the reflection of the rays emanating from the first mirrors takes place with a change in level, the ray reflected onto the second mirror being directed upwardly, i.e. away from film 14. This ray then meets a third plane mirror 322a,322b respectively. The planes of the third mirrors intersect the plane of the film along straight lines parallel with the axis thereof; the planes of the two third mirrors form, with the plane of film 14, an angle of about 85°, the reflecting faces being inclined slightly downwards, i.e. towards film 14. The slope of mirrors 322a,322b brings the ray emanating from the second mirrors into a plane parallel with the plane of film 14. The beams emerging from the third mirrors are therefore horizontal and are directed, for the two optical paths, towards the median longitudinal plane of film 14.

The ensemble of the set of mirrors just described is symmetrical in relation to the perpendicular common to the longitudinal axis of the film, on the one hand, and the edge of the dihedral formed by second mirrors 321a,321b, on the other hand, the common perpendicular being designated Δ. Arranged to pivot about axis Δ are two plane inverting mirrors 323a,323b which are arranged upon the same mobile mounting and back to back. Inverting mirrors 323a,323b receive the rays respectively of third mirrors 322a,322b and pass them respectively to a fourth plane mirror 324a,324b. Inverting mirrors 323a,323b are at right angles to the plane of film 14 and form an angle of 45° with the longitudinal axis of film 14; the mobile mounting which carries them is adapted to assume two positions at 90° to each other. In one of these positions, shown in FIG. 8, mirror 323b passes the light beam emanating from 322b to mirror 324b; in the other position, mirror 323a passes the light beam emanating from 322b to mirror 324a. The reflecting faces of fourth mirrors 324a,324b form an angle of 135° with the plane of film 14 and are directed upwardly; the traces of the corresponding planes on the plane of the film form a right angle with the longitudinal axis of the film.

Located in each optical path, after each of the fourth mirrors 324a,324b, is a total reflection prism 325a,325b; this is a right prism, with a right-angled isosceles base, adapted to rotate, on the one hand, about an axis passing through the hypotenuse and at right angles to the plane of the film and, on the other hand, about an axis arranged along the edge facing the hypotenuse where total reflection is effected, the edge being parallel with the plane of film 14. The adjustment of the apparatus is such that the hypotenuses are substantially perpendicular to the plane of film 14.

Arranged in each optical path, between the inverting mirror and the fourth mirror, is a convergent objective 326a,326b which provides, of the film examined, an image which is observed through an eyepiece 327a,327b arranged, in each optical path, between prisms 325a,325b and eyes 328a,328b of the observer.

When an observer examines a film 14 in the viewer just described, he has stereoscopic vision and he perceives the whole panorama right side up, i.e. with the sky at the top. If he rotates through 90° the mobile mounting of inverting mirrors 323a,323b, he passes from the images shown in FIG. 2 to those shown in FIG. 4. In relation to the image shown in FIG. 2, that shown in FIG. 4 corresponds to a complete 180° inversion, so that the observer, without moving himself or the film has right side up stereoscopic vision of the half of the panorama which he previously saw upside down.

The presence, in each optical path, of systems of lenses 326a,327a or 326b,327b provides a magnification of 2 to 8, even though the optical paths have been extended in relation to the device described in connection with the first variant.

As indicated in connection with the first variant, one of the advantages of the viewer according to the invention is the easy relative transverse adjustment of the two images received by the observer; thus, in order to eliminate, in the observed zone, the transverse displacement of corresponding points in the two images examined, the observer alters the slope of the hypotenuse of one of prisms 325a or 325b, causing it to pivot about its horizontal edge facing the hypotenuse. This alteration in the slope of the prisms may be effected by very simple mechanical means, such as an axis arranged along the edge of the prism and integral therewith, the axis extending outside housing 311 in the form of an adjusting knob.

Transverse adjustment of the viewer as a whole in relation to the film is achieved by shifting the viewer transversely in relation to the film.

Adjusting the angle formed by the hypotenuses of prisms 325a,325b permits relative angular adjustment of the two images producing stereoscopic vision.

It is to be understood that the examples of embodiment described hereinbefore are in no way restrictive and may give rise to desirable modifications, without thereby departing from the scope of the invention. Moreover, adjustments may be effected by acting, not upon the prisms, but upon at least one of the mirrors and, in the case of the second variant in particular, by acting upon the inverting mirrors. Generally speaking, at least one of the plane mirrors of the viewer according to the invention may pivot about a straight line parallel with its plane or contained in its plane.

What we claim is:

1. A stereoscopic viewer for aerial photographs adapted to be placed over a film of panoramic exposures to be examined, said film being arranged flatly and being suitably illuminated, said viewer comprising: optical means for examining simultaneously, through two eyepieces having substantially parallel axes, corresponding points in two successive panoramic photographs in the film to be examined, said optical means defining an optical path between each of the two photographs and one of the observer's eyes; adjusting means for displacing one of the two images perceived by the observer in relation to the other; said optical means comprising, for each optical path, a set of plane-mirrors and, a rotating system for rotating the images substantially about the corresponding viewing axis and assuring an even number of reflections; said adjusting means comprising elements permitting at least one of the rotating systems to pivot about a fixed axis.

2. A stereoscopic viewer for serial photographs adapted to be placed over a film of panoramic exposures to be examined, said film being arranged flatly and being suitable illuminated, said viewer comprising: optical means for examining simultaneously, through two eyepieces having substantially parallel axes, corresponding points in two successive panoramic photographs in the film to be examined, said optical means defining an optical path between each of the two photographs and one of the observer's eyes; adjusting means for displacing one of the two images perceived by the observer in relation to the other; said optical means comprising for each optiocal path, a set of plane-mirrors and, a rotating system for rotating the images substantially about the corresponding viewing axis and assuring an even number of reflections; said adjusting means comprising elements permitting the displacement of at least one of the plane-mirrors.

3. A viewer according to claim 1 or 2, wherein the image-rotating system is a total-reflection prism.

4. A viewer according to claim 3, wherein the adjusting means comprise elements permitting at least one of the prisms to pivot about an axis parallel with the edge thereof facing the total reflection face.

5. A viewer according to claim 3, wherein the total reflection faces of the prisms are substantially perpendicular to each other and to the plane of the film to be examined.

6. A viewer according to claim 3, wherein (m+p) is an even number.

7. A viewer according to claim 1, wherein the image-rotating system is a double-prism Pechan system.

8. A viewer according to claims 1 or 2, wherein the axes of the two eyepieces are arranged in a plane substantially parallel with the longitudinal axis of the film to be examined.

9. A viewer according to claims 1 or 2, wherein the film to be examined is located upon a translucent support comprising a lighting means arranged on the side of the support where there is no film.

10. A viewer according to claims 1 or 2, wherein the set of mirrors comprises, for each of the two incident beams which it receives, successively, from the film to be examined:
   a first mirror arranged at an angle of about 45° to the plane of the film to be examined and at right angles to the longitudinal plane of symmetry of said film, the reflecting surface of said mirror facing said film;
   a second mirror receiving the beam reflected by the first mirror, the plane of said second mirror being at right angles to the plane of the film to be examined and forming an angle of about 45° to the axis of said film;
   and a third mirror reflecting the beam from said second mirror and passing it to the inlet face of one of the two rotating systems.

11. A viewer according to claim 10 wherein the total reflection faces of the prisms are substantially perpendicular to each other and to the plane of the film to be examined.

12. A viewer according to claim 10, wherein the second mirrors are adapted to pivot about an axis parallel with the intersection-edge of their planes.

13. A viewer according to claim 10, wherein the third mirrors are stationary and are combined into a single element, the reflecting face of which forms an angle of about 135° to the plane of the film to be examined.

14. A viewer according to claim 10, wherein at least one of the two first mirrors is mounted slidably in the interior of a slide, to be displaced along the longitudinal axis of the film to be examined.

15. A viewer according to claims 1 or 2, wherein the sets of plane-mirrors associated with each of the.two optical paths, each comprise m mirrors which cause the rays from two corresponding points on two successive panoramic photographs to fall in parallel, but upside down, onto two parallel inverting mirrors which are integral, arranged back to back, and adapted to pivot through 90° about an axis at right angles to the incident rays; and wherein the set of mirrors of each optical path comprises one of said inverting mirrors followed, along the optical path, by p mirrors which return the rays which are reflected onto the inverting mirror towards the rotating system associated with each eyepiece, m and p being positive whole numbers.

16. A viewer according to claim 15 wherein (m+p) is an even number.

17. A viewer according to claim 15, wherein the pivot axis of the two inverting mirrors is at right angles to the plane of the film to be examined.

18. A viewer according to claim 17, wherein the planes of the inverting mirrors are substantially at right angles to the plane of the film, their traces in the plane of said film forming an angle of substantially 45° with the longitudinal axis of the film.

19. A viewer according to claim 18, wherein the traces, in the plane of the film, of the planes of the fourth mirrors are substantially at right angles to the axis of the film, the reflecting faces of said fourth mirrors forming an angle of about 135° with the plane of the film.

20. A viewer according to claim 15, wherein, for each optical path, the set of plane-mirrors comprises three mirrors between the film and the inverting mirror, said three mirrors consisting successively, starting from the film to be examined, of a first mirror arranged at substantially at 45° to the plane of the film substantially at right angles to the longitudinal plane of symmetry of the film, the reflecting surface of said mirror facing said film; of a second mirror receiving the rays reflected from the first, said second mirror forming an angle of close to 45° with the longitudinal axis of the film and an angle (90°+α) with the plane of the film to be examined, α having substantially the same low positive value for the two optical paths, the planes of the second mirrors of the two optical paths having substantially parallel traces on the plane of the film to be examined; and of a third mirror receiving the rays reflected onto the second and passing them to the inverting mirror, the plane of said third mirror having a trace in the plane of the film to be examined which is substantially parallel with the axis of the film and forms, with the plane of said film, an angle close to (90°−α) in order to make the reflected rays substantially parallel with the plane of the film to be examined.

21. A viewer according to claim 15, comprising a single fourth mirror between the inverting mirror and the eyepiece, said last-mentioned mirror receiving the rays from said inverting mirror.

22. A viewer according to claims 1 or 2, wherein, arranged in each optical path, is a group of magnification-multiplying lenses.

23. A viewer according to claims 1 or 2, wherein at least one of the plane-mirrors thereof is mounted to pivot about a straight line parallel with its plane or contained in its plane.

* * * * *